United States Patent [19]

Miyake et al.

[11] Patent Number: 5,079,096
[45] Date of Patent: Jan. 7, 1992

[54] MAGNETIC RECORDING MEDIUM COMPRISING A SUBSTRATE COATED WITH A PRIMER WHICH IS A PROTONIC ACID DOPED POLYANILINE POLYMER

[75] Inventors: Akira Miyake, Mishima; Tsugihiro Doi, Otokuni; Minoru Ezoe, Takatsuki; Akira Ohtani, Ibaraki, all of Japan

[73] Assignee: Hitachi Maxell, Ltd., Osaka, Japan

[21] Appl. No.: 492,958

[22] Filed: Mar. 13, 1990

[30] Foreign Application Priority Data

Mar. 13, 1989 [JP] Japan .................................. 1-60368
Jan. 20, 1990 [JP] Japan .................................. 2-11205

[51] Int. Cl.⁵ .............................................. G11B 23/00
[52] U.S. Cl. ...................................... 428/500; 428/694;
428/900; 252/500
[58] Field of Search ................ 428/500, 900, 694;
252/500

[56] References Cited

U.S. PATENT DOCUMENTS

4,615,829 10/1986 Tamura et al. .................... 252/500
4,617,226 10/1986 Yamaguchi et al. ................ 428/216
4,762,644 8/1988 Kobayashi et al. ................ 252/500

FOREIGN PATENT DOCUMENTS

150129 9/1983 Japan .
20316 2/1985 Japan .

Primary Examiner—Merrell C. Cashion, Jr.
Assistant Examiner—Steven A. Resan
Attorney, Agent, or Firm—Birch, Stewart, Kolasch & Birch

[57] ABSTRACT

A magnetic recording medium comprising a non-magnetic substrate, a primer coating formed on the substrate and comprising an organic conducting polymer and a magnetic layer formed on the primer coating, which has good surface smoothness and low surface resistance.

2 Claims, 3 Drawing Sheets

MAGNETIC RECORDING MEDIUM COMPRISING A SUBSTRATE COATED WITH A PRIMER WHICH IS A PROTONIC ACID DOPED POLYANILINE POLYMER

BACKGROUND OF THE INVENTION

1. Field of the Invention

The present invention relates to a magnetic recording medium such as a magnetic tape, a magnetic disc and a magnetic card and more specifically to an improvement whereby an electrically conductive primer coating is formed between a non-magnetic substrate and a magnetic layer.

2. Description of the Related Art

In general, a magnetic recording medium comprises a non-magnetic substrate, such as a polyester film, and a magnetic layer formed by applying a magnetic paint comprising a magnetic powder, a binder resin, a dispersant, and a lubricant in an organic solvent on the substrate and drying it.

When the magnetic layer has a large surface resistance, it is easily charged with electricity which may cause drop out, due to attracted dust or noise, due to discharge during recording and reproducing.

To form a magnetic layer having a low surface resistance, an electrically conductive material, such as carbon black, is added to the magnetic layer.

Recently, as the recording density of the magnetic recording medium is increased, it has been attempted to increase the amount of the magnetic powder in the magnetic layer, to improve surface smoothness of the magnetic layer and to decrease the thickness of the magnetic layer.

To decrease the surface resistance of the magnetic layer, it has be contemplated to increase the amount of an electrically conductive material, such as carbon black, in the magnetic layer. However, since carbon black is non-magnetic and has a small specific gravity, increase of the amount of carbon black decreases the relative amount of the magnetic powder.

Heretofore, to remove non-magnetic carbon black having a small specific gravity from the magnetic layer, it has been proposed to form a separate primer coating comprising the electrically conductive material, such as carbon black, and a binder resin so as to impart the conductivity to the magnetic recording medium (cf. Japanese Patent Kokai Publication Nos. 150129/1983 and 20316/1985).

To form such a primer coating, a paint comprising the binder resin and an electrically conductive material homogeneously dispersed in the resin is prepared and applied on the non-magnetic substrate. However, the homogeneous dispersion of the electrically conductive material in the binder resin is very troublesome and further the paint cannot be stored for a long time while maintaining the dispersed state of the electrically conductive material. Since the surface smoothness of the primer coating depends on the dispersed state of particles of the electrically conductive material, it is very difficult to produce the magnetic recording medium having good surface smoothness even if the non-magnetic substrate has good surface smoothness. Therefore, the requirement for improved surface smoothness of the magnetic recording medium cannot be fulfilled.

SUMMARY OF THE INVENTION

One object of the present invention is to provide a primer coating which can provide improved surface smoothness of a magnetic recording medium.

Another object of the present invention is to provide a magnetic recording medium having improved surface smoothness and decreased surface resistance.

These and other object of the present invention are achieved by a magnetic recording medium comprising a non-magnetic substrate, a primer coating formed on the substrate and comprising an organic conducting polymer and a magnetic layer formed on the primer coating.

DETAILED DESCRIPTION OF THE INVENTION

The magnetic recording medium of the present invention has a primer coating comprising an organic conducting polymer. The organic conducting polymer can be applied to the substrate in the form of a solution in a solvent and form a clear, electrically conductive film.

Since a very thin film of the conducting polymer can reduce the surface resistance of the magnetic recording medium, the surface smoothness of the non-magnetic substrate can be reflected on the surface smoothness of the magnetic layer. That is, when the non-magnetic substrate has good surface smoothness, the resulting magnetic medium also has good surface smoothness although the primer coating is formed between the substrate and the magnetic layer. Accordingly, the magnetic recording medium of the present invention can satisfy the requirements for high recording density and, in particular, a requirement for high output and low noise in the magnetic recording medium having a very thin magnetic layer of about 0.5 μm or less.

In the present invention, it is not necessary to prepare a paint for the primer coating by dispersing the solid particles in the liquid medium, and the solution of the conducting polymer can be stored for a long time.

Examples of the conducting polymer to be used in the present invention are polyaniline, polypyrrole-3-alkanesulfonic acid, poly(3,4-disubstituted pyrrole), poly3-alkylthiophene and the like. The polyaniline which will be defined below has a much larger molecular weight than known polyanilines and can be dissolved in an organic solvent, so that it easily forms a clear film which has not only good toughness and flexibility but also high tensile strength. Since electric conductivity can be imparted to this film by doping a protonic acid in the film, such polyaniline is highly suitable as the conducting polymer to be used in the present invention.

The doping of the polymer film can be done after the formation of the film, although it is possible to dope the polymer is a solution by adding the dopant, namely the protonic acid, to the solution. In the latter case, since the solution contains the dopant, the conducting polymer film can be formed directly on the substrate by applying the solution on the substrate and evaporating the solvent.

The soluble polyaniline having the high molecular weight can be prepared by gradually adding, to aniline in the presence of the protonic acid having an acid dissociation constant pKa of 3.0 or smaller, an aqueous solution of an oxidizing agent having a standard electrode potential of 0.6V or larger, which is defined as an electro motive force in a reduction half cell reaction utilizing a standard hydrogen electrode as a standard in an amount of at least 2 equivalents, preferably 2 to 2.5 equivalents per one mole of aniline, which equivalent is defined as a value obtained by dividing one mole of the oxidizing agent by the number of electrons required for reducing one molecule of the oxidizing agent at 5° C. or lower, preferably at 0° C. or lower, to form an oxidized polymer of aniline doped with the protonic acid, and then undoping the polymer with a base.

The polyaniline prepared as above can be dissolved in N-methyl-2-pyrrolidone, N,N-dimethylacetamide, N,N-dimethylformamide, dimethylsulfoxide, 1,3-dimethyl-2-imidazolidinone and sulforane. However, it is not dissolved in tetrahydrofurane, a 80 wt. % aqueous solution of acetic acid, a 60 wt. % aqueous solution of formic acid on acetonitrile.

By using such a solution of polyaniline, the clear film can be formed on the non-magnetic substrate. To provide the tough and flexible film, the polyaniline preferably has an intrinsic viscosity of at least 0.40 dl/g measured in N-methyl-2-pyrrolidone at 30° C.

The polyaniline solution may be added to the magnetic paint, or coated on the back face of the non-magnetic substrate or on the magnetic layer.

The clear film of the polyaniline in the undoped state comprises quinonediimine repeating units and phenylenediamine repeating units. Among the polyaniline, one having the following repeating unit structure:

wherein m and n are molar fractions of the quinonediimine repeating units and the phenylenediamine repeating units, respectively, and m is larger than 0 and smaller than 1, n is larger than 0 and smaller than 1 and the sum of m and n is 1, and provides a laser Raman spectrum recorded by exciting with a light having a wavelength of 457.9 nm in which a ratio of the Raman line strength (Ia) assigned to the ring stretching vibration appeared at a wave number range larger than 1,600 cm$^{-1}$ to that (Ib) appeared at a wave number range smaller than 1,600 cm$^{-1}$ (Ia/Ib) is at least 1.0.

The numbers m and n can be adjusted by oxidizing or reducing the polyaniline. By the reduction of the polymer, m is decreased and n is increased, and by the oxidation of the polymer, m is increased and n is decreased. The oxidation and reduction of the polymer is preferably carried out in the solution of the polymer, and then the solution is applied on the substrate and dried to form the polyaniline film, although it is possible to oxidize or reduce the polymer film. Examples of the oxidizing agent are oxygen gas, air and silver oxide. Examples of the reducing agent are hydrazine and phenylhydrazine.

When the reducing agent is used in an excess amount in the reduction of the polymer, since a large portion of the quinonediimine repeating units are reduced, the number of semi-quinone radicals (polaron structures) formed by doping of the quinonediimine units with the protonic acid is decreased so that the electrical conductivity of the doped polyaniline is not so high just after the doping. When the doped polyaniline is kept standing in the air, the reduced phenylenediamine units are gradually air oxidized to form the quinonediimine units which are doped with the protonic acid remaining in the polymer film and generate the semi-quinone radicals, whereby the polyaniline having high electrical conductivity can be obtained.

The electrical conductivity of the polymer film doped with the protonic acid is hardly affected by moisture since the conductivity is caused by electronic conduction.

The electrical conductivity of the doped polymer depends on the pKa value of the used protonic acid. As the dopant for the polyaniline, the protonic acid having the pKa value of 4.8 or less is effective. In the pKa range of 1 to 4, as the pKa value decreases, the electrical conductivity of the doped film increases. When the pKa value is less than 1, the electrical conductivity is constant and not further improved.

Preferred examples of the protonic acid are sulfuric acid, nitric acid, hydrochloric acid, perchloric acid, hydrofluoric acid, oxalic acid, formic acid, acetic acid, benzenesulfonic acid, p-toluenesulfonic acid, picric acid, m-nitrobenzoic acid, dichloroacetic acid, polystyrenesulfonic acid, polyvinylsulfonic acid, polyallylsulfonic acid, polyvinylsulfuric acid, and the like.

The surface resistance depends on the kind of protonic acid. In general, it is from $10^5$ to $10^{10}$ ohm/D.

The solution of the conducting polymer may contain a resin which acts as a binder. Any kind of the binder resin is used insofar as it is dissolved in the solution.

The characteristics of the laser Raman spectrum recorded with the polyaniline prepared in the present invention will be explained in comparison with that recorded with the conventional polyaniline.

In general, a vibrational spectroscopy is used to obtain informations on vibrations among atoms which constitute a material and includes IR spectroscopy and Raman spectroscopy.

The IR spectroscopy detects vibration modes which induce changes of dipole moments, while the Raman spectroscopy detects vibration modes which induces changes of polarizabilities. Therefore, two spectroscopies are complementary to each other. In general, the vibration modes which strongly appear in the IR spectrum appear weakly in the Raman spectrum, and vice versa.

The IR spectrum is recorded by detecting energy absorption between the vibrational levels, while the Raman spectrum is recorded by detecting scattered light (Raman scattering) which is generated when a once excited molecule falls to a vibrational level higher than the normal state. The vibrational energy level is calculated from the energy difference between the scattered light and the irradiated light.

In the Raman spectroscopy, excitation with a visible light such as argon laser is employed.

In case where the sample material has an absorption band in the visible region, when the irradiated laser light matches the wavelength in the absorption band, a very strong Raman line appears. This phenomenon is known as the resonance Raman effect. The strength of the Raman line generated by the resonance Raman effect is $10^4$ to $10^5$ times larger than the usual Raman line. The resonance Raman effect strengthens the information from the chemical structure which is excited by the wavelength of the irradiated laser light. Accordingly, when the Raman spectrum is recorded with changing the wavelength of the irradiated laser light, the chemical structure of the examined material can be more precisely analyzed. This is one of the characteristics of the Raman spectroscopy which is not found in the IR spectroscopy.

Figure 1:
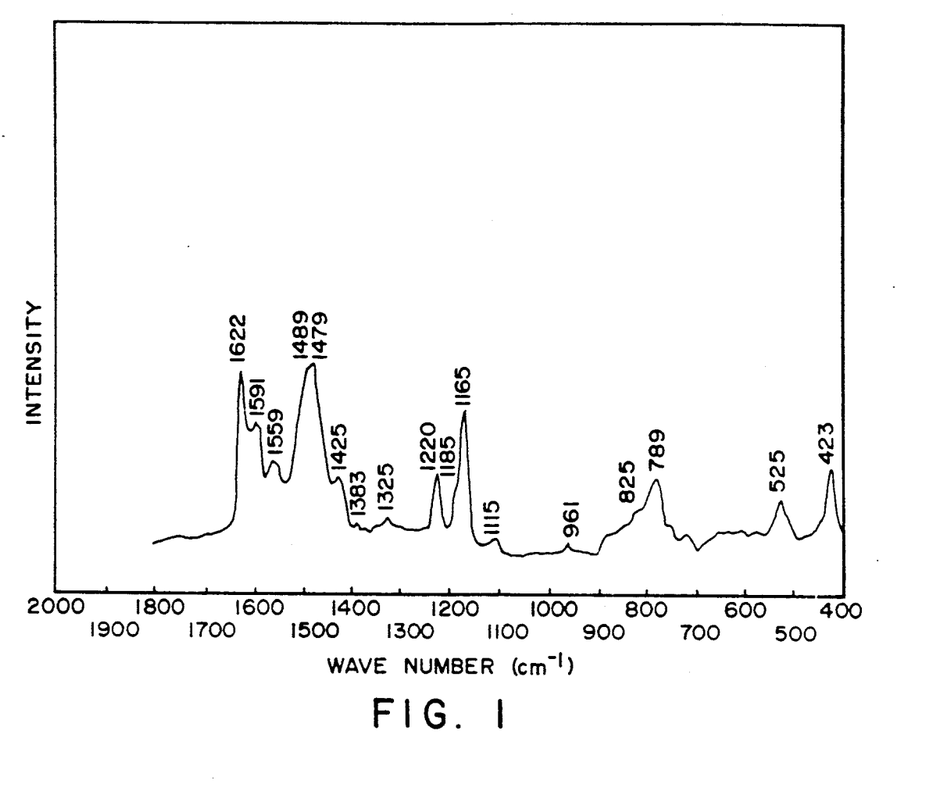
FIG. 1 is a laser Raman spectrum of the polyaniline prepared according to the present invention in the undoped state at the excitation wavelength of 457.9 nm.
Figure 2:
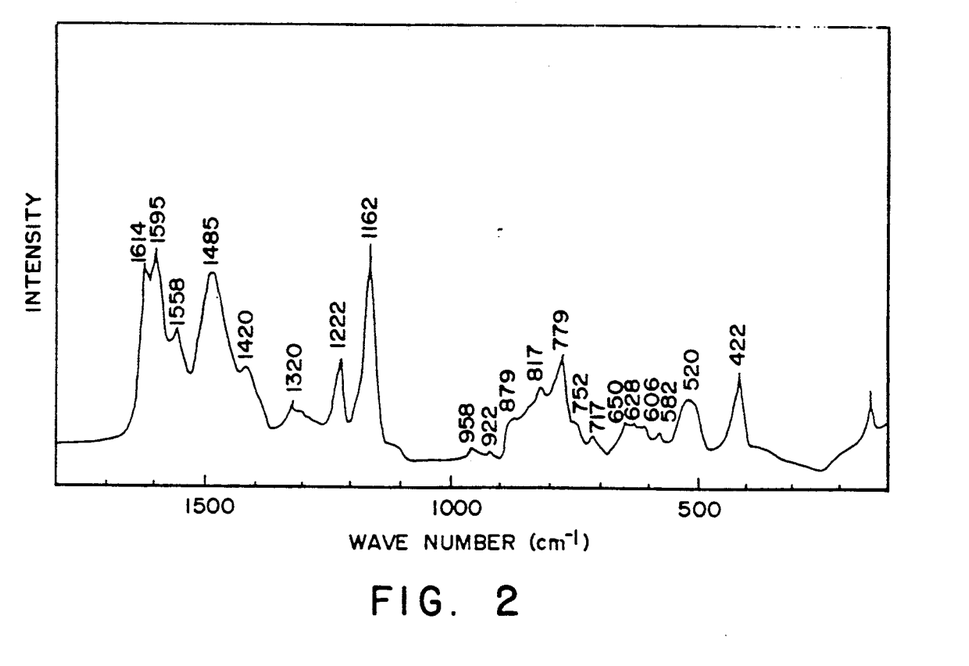
FIG. 2 is a laser Raman spectrum of the conventional polyaniline at the excitation wavelength of 457.9 nm.

FIG. 1 is a laser Raman spectrum recorded by irradiating a laser having a wavelength of 457.9 nm on a sample formed in a disk-like shape from a powder of undoped polyaniline which is soluble in the organic solvent and has an intrinsic viscosity $[\eta]$ of 1.2 dl/g measured in N-methyl-2-pyrrolidone at 30° C. The assignments of the Raman lines are as follows:

1,622 & 1,591 $cm^{-1}$: ring stretching vibration of the parasubstituted benzene 1,489 & 1,479 $cm^{-1}$: stretching vibration of C=C and C=N bonds in the quinonediimine structures 1,220 $cm^{-1}$: mixture of stretching vibrations of C—N and C—C bonds 1,185 & 1,165 $cm^{-1}$: in-plane bending vibration of C—H bonds FIG. 2 is a laser Raman spectrum recorded by irradiating a laser having a wavelength of 457.9 nm on a undoped polyaniline reported by Y. Furukawa et al (Synth. Met., 16, 189 (1986)). This polyaniline is prepared by electrochemical oxidative polymerization of aniline on a platinum electrode.

As seen from FIG. 1, in the laser Raman spectrum of the undoped polyaniline which is prepared by the present invention and soluble in the organic solvent, a ratio of the Raman line strength (Ia) assigned to the ring stretching vibration appeared at a wave number range larger than 1,600 $cm^{-1}$ to that (Ib) appeared at a wave number range smaller than 1,600 $cm^{-1}$ (Ia/Ib) is at least 1.0. In the laser Raman spectrum of the conventional polyaniline of FIG. 2, this ratio is smaller than 1.0.

Figure 3:
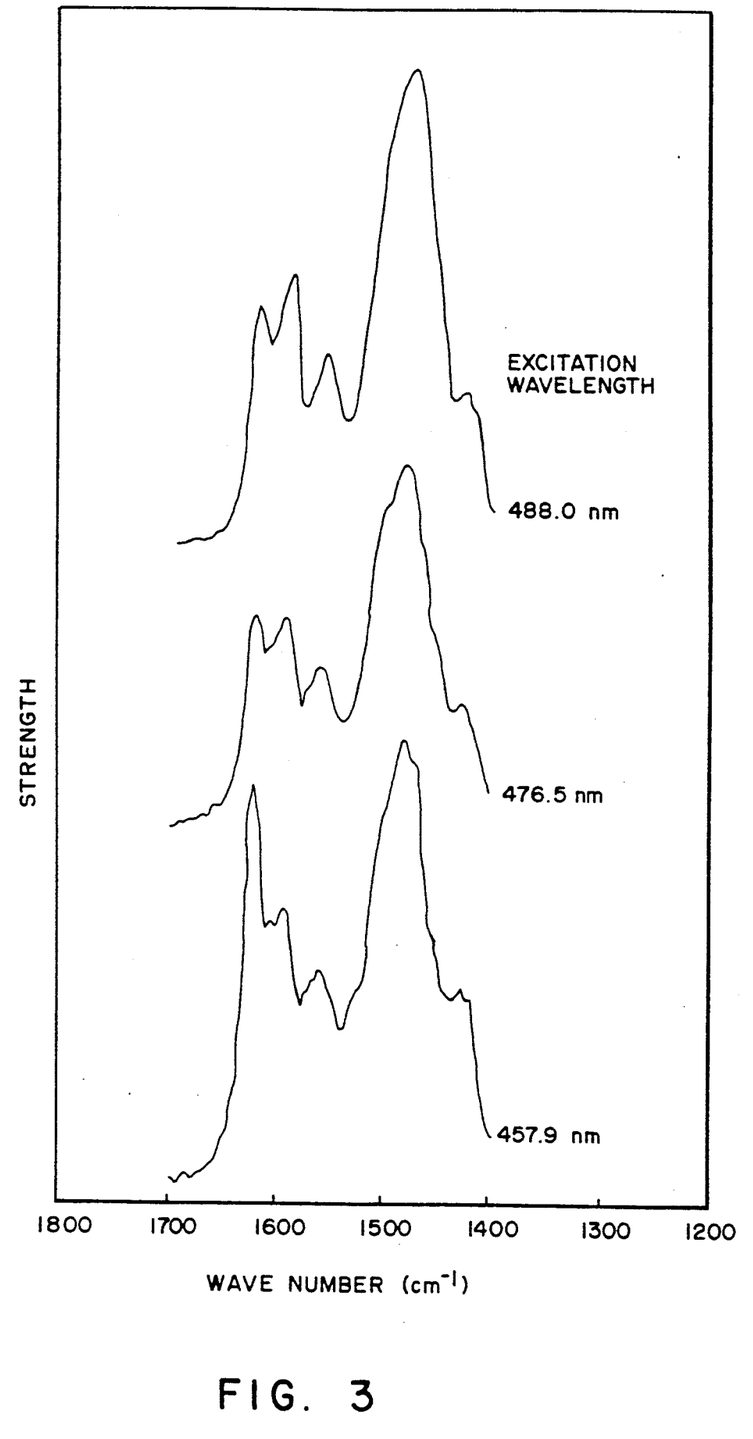
FIG. 3 is laser Raman spectra of the same polyaniline as in FIG. 1 at various excitation wavelengths.

The Raman lines at 1,622 $cm^{-1}$ and 1,591 $cm^{-1}$ are both assigned to the skeletal stretching vibration of the para-substituted benzene. Since the polyaniline in the reduced state has no quinonediimine structure, the Raman line appears only at 1,621 $cm^{-1}$. In the Raman spectrum of the undoped polyaniline having the quinonediimine structure, the Raman lines appear at 1,622 $cm^{-1}$ and 1,591 $cm^{-1}$. These Raman lines have dependency on the excitation wavelength as shown in FIG. 3.

Figure 4:
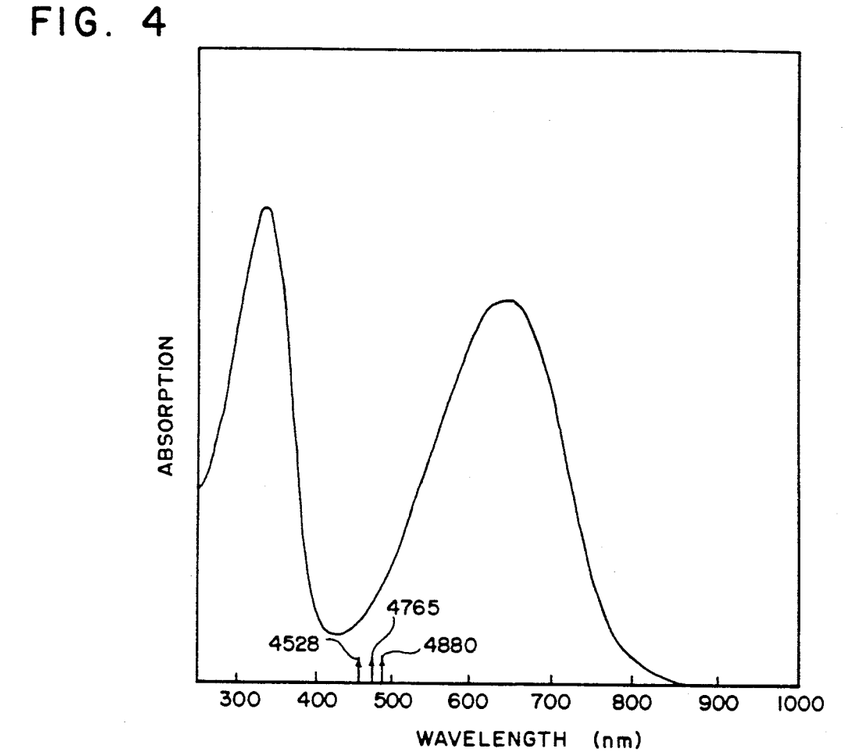
FIG. 4 is an electronic spectrum of a solution of the same polyaniline, as in FIG. 1, in N-methyl-2-pyrrolidone.

As the excitation wavelength is shifted from 488.0 nm to 457.9 nm via 476.5 nm, the Ia/Ib ratio changes. That is, at 488.0 nm, the Ia/Ib ratio is smaller than 1.0, while at 457.9 nm, it is larger than 1.0 and the strengths of Ia and Ib are reversed in comparison to those at 488.0 nm. This reversal of the strengths of Ia and Ib may be explained as follows:

FIG. 4 shows an electronic spectrum of the polyaniline soluble in the organic solvent. Since the peak at 647 nm disappears by the reduction of the polymer, it can be assigned to the quinonediimine structure. Since the strength of the peak at 334 nm is increased by the reduction of the polymer, this peak can be assigned to the $\pi-\pi^*$ transition in the para-substituted benzene. In FIG. 4, the Raman excitation wavelength is also indicated. With respect to the band for the ring stretching vibration of the parasubstituted benzene, when the excitation wavelength is shifted from 488.0 nm to 457.9 nm, the resonance condition for the resonance Raman effect at the 1,622 $cm^{-1}$ band is preferential to that at the 1,591 $cm^{-1}$ band, which causes the reversal of the strengths as described above.

The reason why the relative strengths of the Raman lines at 1,591 $cm^{-1}$ and 1,622 $cm^{-1}$ are different despite of the same excitation wavelength (457.9 nm) is as follows:

From the fact that N,N'-diphenyl-p-phenylenediamine which is a model compound for the phenylenediamine structure has a sole Raman line at 1,617 $cm^{-1}$ and N,N'-diphenyl-p-benzoquinonediimine which a model compound for the quinonediimine structure has Raman lines at 1,568 $cm^{-1}$ and 1,621 $cm^{-1}$, it may be assumed that, as shown in the below (a), the para-substituted benzene ring which is non-conjugated with the quinonediimine structure has the Raman line at 1,622 $cm^{-1}$ the strength of which is increased by the excitation with the shorter wavelength, and as shown in the below (b), the para-substituted benzene ring which is conjugated with the quinonediimine structure has the Raman lines at 1,591 $cm^{-1}$ and 1,622 $cm^{-1}$.

N,N'-Diphenyl-p-phenylenediamine

N,N'-diphenyl-p-benzoquinonediimine

From the elementary analysis, the polyaniline prepared by the present invention which is soluble in the organic solvent in the undoped state contains substantially the same number of the quinonediimine units and the phenylenediamine units, the polymer structure can be classified into the alternating copolymeric chain structure of the quinonediimine units and the phenyl- enediamine units which is shown by the below described structure (c) and the block copolymeric chain structure which is shown by the below described structure (d).

In the structures (c) and (d), the para-substituted benzene rings indicated by the arrows are the benzene rings which are non-conjugated with the quinonediimine units. In the alternating copolymeric chain, two non-conjugated benzene rings are contained in one octamer chain unit, and in the block copolymeric chain, three non-conjugated benzene rings are contained in one octamer chain unit. When the chain length is longer, the difference between the number of the benzene rings which are non-conjugated with the quinonediimine in the alternating polymeric chain and that in the block copolymeric chain is increased. This difference appears as the difference between the relative strengths at 1,591 cm$^{-1}$ and at 1,622 cm$^{-1}$.

meric chain. In general, the imine nitrogen atom (—N=) in the quinonediimine structure forms a hydrogen bond with a hydrogen atom in the neighboring secondary amino group (—NH—) (cf. Macromolecules, 21, 1297 (1988)), while the hydrogen bond between the secondary amino groups is not strong.

Accordingly, when the polyaniline has the alternating copolymeric chain, it forms a strong network through the hydrogen bonds as shown by the structure (f). The reason why most of the conventional anilines in the undoped state are insoluble in many organic solvents may be that the polymer chains form such strong network through the hydrogen bonds.

As in the polyaniline prepared in the present invention which is soluble in the organic solvent in the undoped state, when the polyaniline has the block polymeric chain, since the lengths of the blocks are different from each other, the adjacent phenylenediamine struc- In the polyaniline soluble in the organic solvent which is prepared in the present invention, the Ia/Ib ratio in the Raman spectrum is at least 1.0. This means that the polyaniline contains a number of benzene rings which are non-conjugated with the quinonediimine structure and it has the block copolymeric chain.

The reason why the polyaniline prepared in the preset invention is soluble in the organic solvent can be explained from the fact that it has the block copolyture and quinonediimine structure cannot form the hydrogen bonds as many as possible as shown in the structure (e). Then, the solvent molecules can be present between the polymer chains and form the hydrogen bonds with the polyaniline chains so that the polyaniline is dissolved in the solvent. If all the blocks have the same length, the network could be formed through the hydrogen bonds. But, such possibility is very small.

(f)

The interreaction between the chains can be explained from the C—H in-plane bending vibration in the laser Raman spectrum. The Raman line at 1,162 cm$^{-1}$ which is assigned to the C—H in-plane bending vibration of the undoped polyaniline shifts to the higher wave number side, namely to 1,181 cm$^{-1}$ when the polyaniline is reduced and all the imine nitrogen atoms are converted to the secondary amino nitrogen atoms.

The polyaniline prepared in the present invention which is soluble in the organic solvent gives two Raman lines at 1,165 cm$^{-1}$ and 1,185 cm$^{-1}$ which are assigned to the C—H in-plane bending vibration. The Raman line at 1,185 cm$^{-1}$ is not seen in the Raman spectrum for the conventional polyaniline in the undoped state, which is close to the Raman line at 1,181 cm$^{-1}$ to be assigned to the C—H in-plane bending vibration in the reduced state.

The above facts suggest that the polyaniline prepared in the present invention which is soluble in the organic solvent may have the block copolymeric chain in the undoped state which is close to the reduced structure. From this, such polyaniline can be well soluble in the organic solvent even when it has a high molecular weight. Then, it can be concluded that the polyaniline prepared in the present invention is a novel polyaniline having a new chain structure which is different from the structure of the conventional polyaniline.

Since the polyaniline prepared in the present invention has the block copolymeric chain of the quinonediimine units and the phenylenediamine units, it exhibits electric conductivity through the acid-base reaction without accompanying the oxidation-reduction reaction. Such mechanism of the electric conductivity is explained by A. G. MacDiarmid et al (J. Chem. Soc., Chem. Commun., 1987, 1784). By the doping with the protonic acid, the quinonediimine structures are protonated as shown below to give the semiquinone radical structures which have the electrical conductivity. Such state is so-called a polaron state.

HX (protonic acid)

[Semi-quinone cationic radicals (polaron)]

As the non-magnetic substrate on which the primer coating is formed, any of conventionally used substrates may be used. Examples of the substrate materials are polyesters (e.g. polyethylene terephthalate, polyethylene 2,6-naphthalate, etc.), polyolefins (e.g. polyethylene, polypropylene, etc.), cellulose derivatives (e.g. cellulose triacetate, cellulose diacetate, etc.), vinyl resins (e.g. polyvinyl chloride, polyvinylidene chloride, etc.), polycarbonate, polyimide, polyamide, non-magnetic metals, ceramics and the like. The substrate may be in the form of a film, a tape, a sheet, a disc or a drum.

In the present invention, after forming the electric conductive primer on the substrate, a magnetic paint comprising a magnetic powder dispersed in a solution of a binder resin in an organic solvent is applied and dried to form the magnetic layer.

As the magnetic powder, any of the conventional ones may be used. Examples of the magnetic powder are oxide type magnetic powder (e.g. $\gamma$-$Fe_2O_3$, $Fe_3O_4$, Co-containing $\gamma$-$Fe_2O_3$, $CrO_2$, barium ferrite, etc.), ferromagnetic powder (e.g. metals such as iron, cobalt and nickel; alloys of iron, cobalt, nickel or zinc; powder of these metals or alloys particles of which have coatings of oxides of iron, aluminum or silicon.

Also, the binder resin may be any of the conventionally used binders. Examples are vinyl chloride base resins (e.g. vinyl chloride-vinyl acetate copolymer, vinyl chloride-vinyl acetate-vinyl alcohol copolymer, vinyl chloride-acrylate copolymer, vinyl chloride-vinylidene chloride copolymer, vinyl chloride-acrylonitrile copolymer, vinyl chloride-vinyl acetate-maleic acid copolymer, etc.), thermoplastic polyurethane resins, thermosetting polyurethane resins, polyester resins, phenoxy resins, polyvinylbutyral resin, cellulose derivatives, epoxy resins and mixtures thereof. To these resins, hydrophilic polar groups (e.g. carboxylic acid group, sulfonic acid group, phosphoric acid group, amine group, etc.) can be introduced to improve the dispersibility of the magnetic powder, or acrylic double bonds can be introduced to cure the resin with electron ray radiation.

Examples of the solvent for preparing the magnetic paint are alcohols (e.g. ethanol, propanol, butanol, etc.), esters (e.g. methyl acetate, ethyl acetate, butyl acetate, etc.), ketones (e.g. methyl ethyl ketone, methyl isobutyl ketone, cyclohexanone, etc.), ethers (e.g. tetrahydrofurane, dioxane, etc.), aromatic hydrocarbons (e.g. benzene, toluene, xylene, etc.), aliphatic hydrocarbons (e.g. heptane, hexane, cyclohexane, etc.), chlorohydrocarbons (e.g. methylene chloride, ethylene chloride, chloroform, etc.) and mixtures thereof.

The magnetic layer may contain various conventionally used additives such as a dispersant, an abrasive and a liquid or solid lubricant.

PREFERRED EMBODIMENTS OF THE INVENTION

The present invention will be explained further in detail the following Examples, in which "parts" are by weight unless otherwise indicated.

EXAMPLE 1

(1) Formation of a primer coating

To a 10 liter separable flask equipped with a stirrer, a thermometer and a dropping funnel, distilled water (4,500 g), 36 wt. % hydrochloric acid (300 ml) and aniline (300 g, 3.22 moles) were charged in this order to dissolve aniline in the medium.

In the separate step, to distilled water (1,120 g) in a beaker, 97 wt. % concentrated sulfuric acid (320 g, 3.2 moles) was added and mixed while cooling with iced water to prepare an aqueous solution of sulfuric acid.

The aqueous solution of sulfuric acid was poured in the separable flask, and the whole flask was cooled in a low temperature controlled bath to a temperature lower than 5° C.

In a separate beaker, to distilled water (1,720 g), ammonium peroxodisulfate (735 g, 3.22 moles) was added and dissolved to prepare an aqueous solution of the oxidizing agent.

While cooling the whole flask in the low temperature controlled bath to keep the reaction mixture at a temperature lower than −3° C., the aqueous solution of ammonium peroxodisulfate was dropwise added to the aqueous solution of aniline over 6 hours. At first, a colorless transparent solution turned to greenish blue and then to dark green as the polymerization proceeded. Finally, dark green powder was precipitated. After the addition of the aqueous solution of ammonium peroxodisulfate, the reaction mixture was further stirred for 45 minutes at −3° C.

To the reaction mixture containing a conducting polymer in the doped state, a 25 wt. % aqueous ammonia (1,500 ml) was added and stirred for 1.5 hours while cooling. The reaction mixture turned from dark green to bluish purple.

The powder was recovered by filtering the mixture through a Buchner funnel and washed in a beaker with distilled water until the filtrate becomes neutral and then with acetone until the filtrate becomes colorless.

Then, the powder was dried under reduced pressure at room temperature for ten hours to obtain dark brown polymer powder in the undoped state.

The obtained polymer was soluble in N-methyl-2-pyrrolidone, and its solubility was 8 g per 100 g of this solvent. The intrinsic viscosity in this solvent at 30° C. was 1.20.

The solubility of the polymer in dimethylsulfoxide or dimethylformamide was less than 1 % by weight. The polymer was substantially insoluble in tetrahydrofurane, pyridine, an 80 wt. % aqueous solution of acetic acid or a 60 wt. % aqueous solution of formic acid.

With a disc shaped sample of the undoped polyaniline powder, the laser Raman spectrum was recorded at the excitation wavelength of 457.9 nm. The result is shown in FIG. 1.

For comparison, with the undoped polyaniline reported by Y. Furukawa et al (Synth. Met., 16, 189 (1986)), the laser Raman spectrum was recorded at the excitation wavelength of 457.9 nm. This polyaniline was produced by electrochemical oxidative polymerization on the platinum electrode. This spectrum in the above literature is shown in FIG. 2.

With the disc shaped sample of the undoped polyaniline, the Raman spectrum was recorded with shifting the wavelength of laser excitation light from 488.0 nm to 457.9 nm in the range of 1,400 $cm^{-1}$ to 1,700 $cm^{-1}$. The results are shown in FIG. 3. As the excitation wavelength was shifted from 488.0 nm to 457.9 nm via 476.5 nm, the Ia/Ib ratio changed and at the wavelength of 457.9 nm, this ratio was larger than 1.0 and reversed in comparison to that at 488.0 nm.

The electronic spectrum with a solution of the undoped polyaniline in N-methyl-2-pyrrolidone is shown in FIG. 4.

Figure 5:
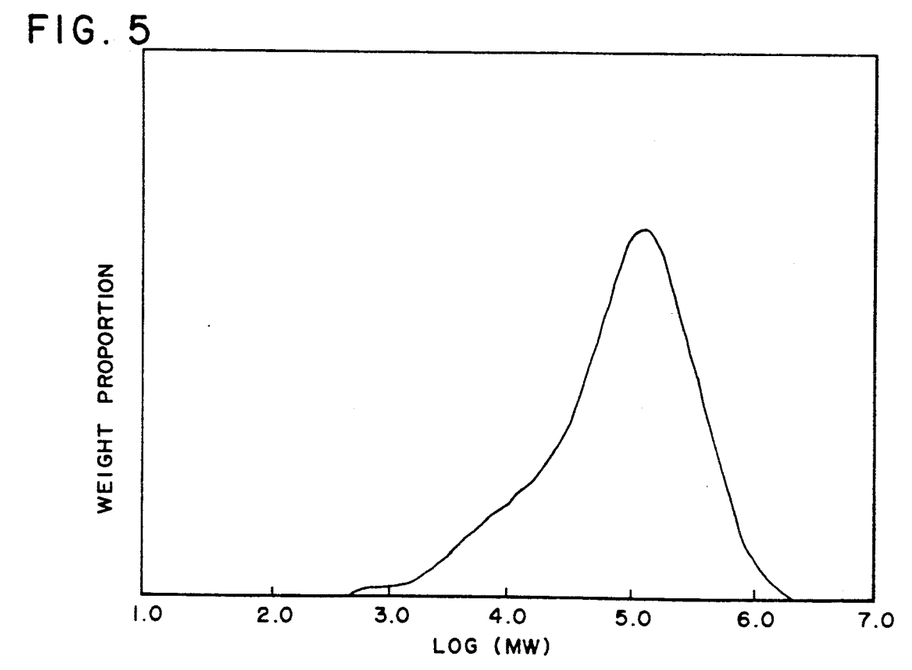
FIG. 5 shows a molecular weight distribution of the same polyaniline, as in FIG. 1, measured by GPC.

The polyaniline powder was subjected to GPC with using three kinds of GPC columns for N-methyl-2-pyrrolidone connected in series and, as an eluent, a solution of lithium bromide in N-methyl-2-pyrrolidone in a concentration of 0.01 mole/liter. The result of GPC analysis is shown in FIG. 5.

The results indicated that the polyaniline had an number average molecular weight of 23,000 and a weight average molecular weight of 160,000 (both converted to polystyrene molecular weights).

Then, a 0.5 wt. % solution of the soluble polyaniline in N-methyl-2-pyrrolidone was coated on both surfaces of a polyethylene terephthalate film having a thickness of 75 μm and dried. The coated film was then doped with 1N sulfuric acid followed by washing with acetone and drying to form a non-magnetic film having electrically conductive primer films. The cross sections of the organic conducting polymer films were observed with a transmission type electron microscope to find that the thickness of each film was 0.08 μm.

(2) Formation of a magnetic layer

The following components were mixed in a ball mill to prepare a magnetic paint:

| Component | Parts |
| --- | --- |
| Barium ferrite magnetic powder (coercive force: 490 Oe, saturation magnetization: 57 emu/g, specific surface area: 32 m$^2$/g) | 100.0 |
| Vinyl chloride-vinyl acetate-vinyl alcohol copolymer (Eslek A manufactured by Sekisui Chemical Co. Ltd.) | 10.0 |
| Thermoplastic polyurethane resin (Nipporan N 2301 manufactured by Nippon Polyurethane Industries, Ltd.) | 10.0 |
| Alumina (AKP 48 manufactured by Sumitomo Chemical Co., Ltd.) | 8.0 |
| Oleyl oleate | 5.0 |
| Cyclohexanone | 115.0 |
| Toluene | 115.0 |

On the surfaces of the primer coatings formed on the non-magnetic substrate, the magnetic paint was coated to thickness of 2.0 μm and 0.4 μm, respectively and dried followed by calendering. The coated film was then cut to form a magnetic disc having a diameter of 8.58 cm.

EXAMPLE 2

In the same manner as in Example 1 but doping the primer coatings with a 1N aqueous solution of polyvinylsulfonic acid in place of 1N sulfuric acid, the magnetic disc was produced.

EXAMPLE 3

In the same manner as in Example 1 but doping the primer coatings with a 1N aqueous solution of polystyrenesulfonic acid in place of 1N sulfuric acid, the magnetic disc was produced.

EXAMPLE 4

The polyaniline powder prepared in the same manner as in Example 1 (15 g), p-toluenesulfonic acid monohydrate (15.75 g), phenylhydrazine (4.48 g) and a polyester resin (Vilon 200 manufacture by Toyobo) (15 g) were dissolved in N-methyl-2-pyrrolidone (1,450 g) and the resulting solution was coated on the both surfaces of the polyethylene terephthalate film having the thickness of 75 μm and dried. The surface resistance was $10^{10}$ ohm/□ just after drying. After kept standing in the air, the polymer was air oxidized and the number of the quinonediimine structures increased so that the surface resistance decreased to $10^5$ ohm/□ after 4 days.

The cross sections of the organic conducting polymer films formed on the both surfaces of the non-magnetic substrate were observed with the transmission type electron microscope to find that each polymer film had a thickness of 0.07 μm.

With the use of the prepared non-magnetic substrate having the conducting polymer films thereon, the magnetic disc was produced in the same manner as in Example 1.

EXAMPLE 5

The polyaniline powder prepared in the same manner as in Example 1 (15 g), p-toluenesulfonic acid monohydrate (15.75 g), phenylhydrazine (1.12 g) and a polyester resin (Vilon 200 manufacture by Toyobo) (15 g) were dissolved in N-methyl-2-pyrrolidone (1,453 g) and the resulting solution was coated on the both surfaces of the polyethylene terephthalate film having the thickness of 75 μm and dried. The surface resistance was $10^7$ ohm/□ just after drying. After kept standing in the air, the polymer was air oxidized and the quinonediimine structures increased so that the surface resistance decreased to $10^5$ ohm/□ after 10 hours.

The cross sections of the organic conducting polymer films formed on the both surfaces of the non-magnetic substrate were observed with the transmission type electron microscope to find that each polymer film had a thickness of 0.09 μm.

With the use of the prepared non-magnetic substrate having the conducting polymer films thereon, the magnetic disc was produced in the same manner as in Example 1.

Comparative Example 1

In the same manner as in Example 1 but forming no primer coating on the non-magnetic substrate, the magnetic disc was produced.

Comparative Example 2

A primer paint was prepared by mixing the following components in the ball mill for 96 hours:

| Component | Parts |
| --- | --- |
| Carbon black (Morgan L manufactured by Cabot) | 55.0 |
| Goethite (Y-LOP manufactured by Titanium Industries) | 45.0 |
| Vinyl chloride-vinyl acetate-vinyl alcohol copolymer (Eslek A manufactured by Sekisui Chemical Co., Ltd.) | 33.3 |
| Thermoplastic polyurethane resin (Paraprene 22S manufactured by Nippon Polyurethane Industries, Co., Ltd.) | 20.0 |
| Trifunctional isocyanate cross linking agent (Colonate L manufactured by Nippon Polyurethane Industries, Co., Ltd.) | 13.3 |
| Cyclohexanone | 330.0 |
| Toluene | 330.0 |

Then, the primer paint was coated on the both surfaces of the polyethylene terephthalate film having the thickness of 75 μm to a thickness of 1.0 μ each and cured at 80° C. for 16 hours.

With the use of the above produced non-magnetic substrate having the primer coatings, the magnetic disc was produced in the same manner as in Example 1.

Comparative Example 3

In the same manner as in Comparative Example 1 but additionally using carbon black (Vulcan XC-72 manufactured by Cabot) (15 parts) to the magnetic paint, the magnetic disc was produced in the same manner as in Comparative Example 1.

With each of the magnetic discs produced in Examples and Comparative Examples, residual magnetic flux density ($B_m$) was measured. In addition, surface resistance and surface smoothness ($R_a$) were measured as follows:

Surface resistance

A pair of rod shape electrodes having a quadrant cross section of 1 cm in radius were placed horizontally in parallel at a distance of 12.7 cm. Over the electrodes, a magnetic tape was bridged with contacting its magnetic layer to the electrodes and tensioned with weights of each 160 g attached to each end of the tape. Then, a direct current voltage of 500V was applied to the electrodes and resistance was measured, from which surface resistance was calculated (JIS C 6240).

Surface smoothness

A tracer type surface roughness tester was used to measure $R_a$. The R of the tracer was 2 cm and cut off was 0.08 mm.

The results are shown in the following Table.

TABLE

| Example No. | Surface resistance of primer[1] (ohm/□) | $R_a$ of primer (μm) | Thickness of magnetic layer (μm) | Surface resistance of magnetic layer (ohm/□) | $B_m$ of magnetic layer (G) | $R_a$ of magnetic layer (μm) |
|---|---|---|---|---|---|---|
| 1 | $5 \times 10^5$ | 0.003 | 0.4 | $1 \times 10^6$ | 1450 | 0.005 |
|   |   |   | 2.0 | $3 \times 10^6$ | 1420 | 0.007 |
| 2 | $6 \times 10^5$ | 0.003 | 0.4 | $2 \times 10^6$ | 1450 | 0.005 |
|   |   |   | 2.0 | $5 \times 10^6$ | 1410 | 0.007 |
| 3 | $3 \times 10^6$ | 0.003 | 0.4 | $1 \times 10^7$ | 1450 | 0.005 |
|   |   |   | 2.0 | $3 \times 10^7$ | 1410 | 0.007 |
| 4 | $9 \times 10^5$ | 0.003 | 0.4 | $6 \times 10^6$ | 1450 | 0.005 |
|   |   |   | 2.0 | $1 \times 10^7$ | 1420 | 0.007 |
| 5 | $8 \times 10^5$ | 0.003 | 0.4 | $5 \times 10^6$ | 1450 | 0.005 |
|   |   |   | 2.0 | $8 \times 10^6$ | 1410 | 0.007 |
| Comp. 1 | $(2 \times 10^{13})$ | (0.003) | 0.4 | $1 \times 10^{12}$ | 1460 | 0.005 |
|   |   |   | 2.0 | $1 \times 10^{12}$ | 1420 | 0.007 |
| Comp. 2 | $7 \times 10^6$ | 0.008 | 0.4 | $2 \times 10^7$ | 1440 | 0.009 |
|   |   |   | 2.0 | $7 \times 10^7$ | 1410 | 0.009 |
| Comp. 3 | $(2 \times 10^{13})$ | (0.003) | 0.4 | $8 \times 10^8$ | 930 | 0.007 |
|   |   |   | 2.0 | $5 \times 10^8$ | 900 | 0.009 |

Note:
[1] The surface resistance and $R_a$ in Comparative Examples 1 and 3 were that of the polyethylene terephthalate film.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording medium comprising a non-magnetic substrate, a primer coating on said substrate and a magnetic layer on said primer coating, said primer coating being prepared by doping a polyaniline polymer with a protonic acid having a pKa value of 4.8 or less, which polymer comprises, in a undoped state, repeating units of the formula:

wherein m and n are molar fractions of the quinonediimine repeating units and the phenylenediamine repeating units, respectively, and m is larger than 0 and smaller than 1, n is larger than 0 and smaller than 1, and the sum of m and n is 1, and provides a laser Raman spectrum recorded by exciting with a light having a wavelength of 457.9 nm in which a ratio of the Raman line strength (Ia) assigned to the ring stretching vibration appeared at a wave number range larger than 1,600 $cm^{-1}$ to that (Ib) appeared at a wave number range smaller than 1,600 $cm^{-1}$ (Ia/Ib) is at least 1.0.

2. A magnetic recording medium comprising a non-magnetic substrate, a primer coating on said substrate consisting essentially of a conductive polyaniline polymer and a magnetic layer on said primer coating, said polyaniline polymer being prepared by doping said polymer with a protonic acid having a pKa value of 4.8 or less, which polymer comprises, in an undoped state, repeating units of the formula:

wherein m and n are molar fractions of the quinonediimine repeating units and the phenylenediamine repeating units, respectively, and m is larger than 0 and smaller than 1, n is larger than 0 and smaller than 1, and the sum of m and n is 1, and has an intrinsic viscosity of at least 0.40 dl/g measured in N-methyl-2-pyrrolidone at 30° C.

* * * * *

UNITED STATES PATENT AND TRADEMARK OFFICE
CERTIFICATE OF CORRECTION

PATENT NO. : 5,079,096
DATED      : Jan. 7, 1992
INVENTOR(S) : Akira MIYAKE et al It is certified that error appears in the above-identified patent and that said Letters Patent is hereby corrected as shown below:

On title page, Item [73] after "Hitachi Maxell, Ltd., Osaka, Japan" insert --Nitto Denko Corporation, Osaka-fu, Japan--

Signed and Sealed this

Twelfth Day of April, 1994

Attest:

BRUCE LEHMAN

Attesting Officer

Commissioner of Patents and Trademarks